US012667062B1

(12) United States Patent
Godwin

(10) Patent No.: US 12,667,062 B1
(45) Date of Patent: Jun. 30, 2026

(54) ARTICULABLE MULTI-ARM PLANT SUPPORT

(71) Applicant: Michael J. Godwin, Virginia Beach, VA (US)

(72) Inventor: Michael J. Godwin, Virginia Beach, VA (US)

( * ) Notice: Subject to any disclaimer, the term of this patent is extended or adjusted under 35 U.S.C. 154(b) by 0 days.

(21) Appl. No.: 18/791,305

(22) Filed: Jul. 31, 2024

(51) Int. Cl.
| *A01G 17/00* | (2006.01) |
| *A01G 9/12* | (2006.01) |
| *A01G 17/06* | (2006.01) |

(52) U.S. Cl.
CPC .............. *A01G 17/06* (2013.01); *A01G 9/128* (2013.01)

(58) Field of Classification Search
CPC ........ A01G 17/04; A01G 17/06; A01G 17/14; A01G 9/12
See application file for complete search history.

(56) References Cited

U.S. PATENT DOCUMENTS

| 1,709,666 A | * | 4/1929 | Hengstenberg | .......... H01Q 7/02 |
| 1,804,305 A | * | 5/1931 | Beebe | ........................ H01Q 7/02 |
| 5,639,056 A | * | 6/1997 | Mecalf | ................... F16M 13/00 |
| | | | | 248/523 |

| 6,685,145 B2 | * | 2/2004 | Mackay | ..................... A47F 5/00 |
| | | | | 248/125.1 |
| 7,624,534 B1 | | 12/2009 | Maeder | |
| 7,918,051 B2 | | 4/2011 | Early | |
| 8,813,422 B1 | | 8/2014 | Laudenklos | |
| 2007/0289210 A1 | | 12/2007 | Gray | |
| 2009/0001197 A1 | * | 1/2009 | Dilday | ................... F16M 11/02 |
| | | | | 239/268 |
| 2012/0298812 A1 | * | 11/2012 | Costarella | .............. F16M 11/04 |
| | | | | 248/121 |
| 2015/0033623 A1 | | 2/2015 | Mauro et al. | |
| 2016/0302366 A1 | * | 10/2016 | Shadowshot | ............ A01G 9/12 |
| 2020/0275613 A1 | * | 9/2020 | Tilley | ....................... A01G 9/12 |

* cited by examiner

*Primary Examiner* — Joshua J Michener
*Assistant Examiner* — Henry Hooper Mudd
(74) *Attorney, Agent, or Firm* — Shaddock Law Group, PC

(57) ABSTRACT

An articulable multi-arm plant support including at least some of a support hub having a hub core, wherein one or more hub arms extend from the hub core, wherein at least one hub arm aperture is formed through a first hub arm sidewall and a second hub arm sidewall of each hub arm; and at least one support arm associated with each hub arm, wherein at least one arm projection extends from each support arm, wherein at least one support arm aperture is formed through each support arm, and wherein a portion of at least one of the support arms is positioned such that a pivot pin is positionable thorough the first hub arm aperture, through the support arm aperture, and through the second hub arm aperture to pivotably attach or couple a support arm to one of the hub arms.

20 Claims, 10 Drawing Sheets

ARTICULABLE MULTI-ARM PLANT SUPPORT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of plant supports and plant support structures.

2. Description of Related Art

It is generally known to provide plant supports or plant support structures for a variety of plants. The supports were support structures typically provide a rigid structure for the plant to attach to or be attached or coupled to, to maintain the plant in a desired position.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Unfortunately, known plant supports or plant support structures have a number of shortcomings. For example, currently known plant supports or plant support structures do not provide a desirable degree of flexibility in the manipulation of the plant support or plant support structure. Additionally, known plant supports or plant support structures lack a degree of adjustability that can be advantageous for use with a variety of plants or plant structures.

In order to overcome these and other shortcomings of known plant supports or plant support structures, the articulable multi-arm plant support of the present disclosure provides an articulable multi-arm plant support for improved stability, manipulation, and adjustability. In various exemplary, nonlimiting embodiments, the articulable multi-arm plant support of the present disclosure also provides an additional support strings for supporting and/or intertwining portions of plants.

Thus, the present disclosure provides a plant support structure that can be used for tomato, eggplant, pepper, or other upright growing plants that need support. The general structure of the support system can be modified and certain parts of the support structure are interchangeable to suit the needs of the buyer or to easily be adjusted/modified as a plant grows.

In certain exemplary, nonlimiting embodiments, the articulable multi-arm plant support of the present disclosure provides at least some of a support hub having a hub core and one or more hub arms, wherein the hub core includes a hub core aperture extending through the hub core from a hub core bottom wall to a hub core top wall, substantially parallel to a longitudinal axis of the hub core, wherein each of the one or more hub arms extends radially from the hub core, wherein each of the hub arm extends from a hub arm proximal end to a hub arm distal end, wherein each hub arm includes a pair of opposed side walls comprising a first hub arm sidewall and a second hub arm sidewall, wherein a hub arm recess is defined between at least a portion of an interior surface of the first hub arm sidewall and at least a portion of an interior surface of the second hub arm sidewall, wherein each hub arm includes a hub arm support wall, which extends between at least a portion of the first hub arm sidewall and the second hub arm sidewall, proximate the hub arm distal end, and wherein at least one first hub arm aperture is formed through at least a portion of the first hub arm sidewall and wherein at least one second hub arm aperture is formed through at least a portion of the second hub arm sidewall; and one or more support arms, wherein each of the support arms extends from a support arm proximal end to a support arm distal end, wherein at least one support arm is associated with each hub arm, wherein at least one arm projection extends from an area proximate the support arm distal end of each support arm, wherein at least one support arm aperture is formed through a portion of each of the support arms proximate the support arm proximal end, and wherein a portion of at least one of the support arms is positioned within a corresponding one of the hub arm recesses, such that the support arm aperture of the one of the support arms is aligned with the first hub arm aperture and the second hub arm aperture of the corresponding one of the support arms and at least a portion of a pivot pin is urged through at least a portion of the first hub arm aperture, through the support arm aperture, and through at least a portion of the second hub arm aperture, such that the one of the support arms is pivotally attached or coupled to one of the hub arms.

In certain exemplary, nonlimiting embodiments, the hub core is substantially cylindrically shaped.

In certain exemplary, nonlimiting embodiments, each of the one or more hub arms extends substantially perpendicular to the longitudinal axis of the hub core.

In certain exemplary, nonlimiting embodiments, the hub arm proximal end of each of the one or more hub arms extends from the hub core.

In certain exemplary, nonlimiting embodiments, at least a portion of the interior surface of the first hub arm sidewall is substantially parallel to at least a portion of the interior surface of the second hub arm sidewall.

In certain exemplary, nonlimiting embodiments, a borehole axis of the first hub arm aperture is substantially parallel to a borehole axis of the second hub arm aperture.

In certain exemplary, nonlimiting embodiments, the hub support is formed as a monolithic, one-piece, or integral unit.

In certain exemplary, nonlimiting embodiments, the support arms comprise support arms of varying lengths.

In certain exemplary, nonlimiting embodiments, at least one set screw aperture is formed through a portion of the hub core such that interaction between the set screw aperture and a set screw allow at least a portion of the set screw to frictionally engage at least a portion of a support pole and aid in maintaining the support hub in the desired position relative to the support pole.

In certain exemplary, nonlimiting embodiments, each support arm has a substantially circular, cross-sectional profile, when viewed from the support arm proximal end or the support arm distal end.

In certain exemplary, nonlimiting embodiments, at least a portion of a support pole is repeatably, slidably receivable through the hub core aperture.

In certain exemplary, nonlimiting embodiments, a plurality of the support hubs are slidably positioned along a portion of a support pole.

In certain exemplary, nonlimiting embodiments, each arm projection is attached or coupled to the support arm distal end of a respective one of the arm projections.

In certain exemplary, nonlimiting embodiments, each arm projection is an integrally formed protrusion of the support arm distal end of a respective one of the arm projections.

In certain exemplary, nonlimiting embodiments, each arm projection is defined by a notch or groove formed proximate the support arm distal end of a respective one of the arm projections.

In certain exemplary, nonlimiting embodiments, a portion of a string or cord is attached or coupled between at least two of the arm projections.

In certain exemplary, nonlimiting embodiments, one of the support arms is pivotably attached or coupled to each of the hub arms such that each of the support arms is repeatably rotatable or articulable between a collapsed position and an expanded position.

In certain exemplary, nonlimiting embodiments, in an extended position, a portion of at least one of the support arms contacts a portion of the hub arm support wall in order to limit rotation or articulation of the support arm.

In certain exemplary, nonlimiting embodiments, the articulable multi-arm plant support of the present disclosure provides at least some of a support hub having a hub core with a hub core aperture extending therethrough, substantially parallel to a longitudinal axis of the hub core, wherein one or more hub arms extend radially from the hub core, wherein each of the hub arm extends from a hub arm proximal end to a hub arm distal end, wherein each hub arm includes a first hub arm sidewall and a second hub arm sidewall, wherein each hub arm includes a hub arm support wall formed proximate the hub arm distal ends of the first hub arm sidewall and the second hub arm sidewall, and wherein at least one first hub arm aperture is formed through at least a portion of the first hub arm sidewall and wherein at least one second hub arm aperture is formed through at least a portion of the second hub arm sidewall; and one or more support arms, wherein each of the support arms extends from a support arm proximal end to a support arm distal end, wherein at least one support arm is associated with each hub arm, wherein at least one arm projection extends from an area proximate the support arm distal end of each support arm, wherein at least one support arm aperture is formed through a portion of each of the support arms proximate the support arm proximal end, and wherein a portion of at least one of the support arms is positioned such that the support arm aperture of the one of the support arms is aligned with the first hub arm aperture and the second hub arm aperture of the corresponding one of the support arms and at least a portion of a pivot pin is urged through at least a portion of the first hub arm aperture, through the support arm aperture, and through at least a portion of the second hub arm aperture, such that the one of the support arms is pivotably attached or coupled to one of the hub arms.

In certain exemplary, nonlimiting embodiments, the articulable multi-arm plant support of the present disclosure provides at least some of a support hub having a hub core with a hub core aperture extending therethrough, substantially parallel to a longitudinal axis of the hub core, wherein one or more hub arms extend radially from the hub core, wherein each of the hub arm extends from a hub arm proximal end to a hub arm distal end, wherein each hub arm includes a first hub arm sidewall and a second hub arm sidewall, wherein each hub arm includes a hub arm support wall formed proximate the hub arm distal ends of the first hub arm sidewall and the second hub arm sidewall, and wherein at least one first hub arm aperture is formed through at least a portion of the first hub arm sidewall and wherein at least one second hub arm aperture is formed through at least a portion of the second hub arm sidewall; and at least one support arm is associated with each hub arm, wherein at least one arm projection extends from an area proximate the support arm distal end of each support arm, wherein at least one support arm aperture is formed through a portion of each of the support arms proximate a support arm proximal end of each of the support arms, and wherein a portion of at least one of the support arms is positioned such that at least a portion of a pivot pin is positionable thorough at least a portion of the first hub arm aperture, through the support arm aperture, and through at least a portion of the second hub arm aperture such that the one of the support arms is pivotably attached or coupled to one of the hub arms.

The present disclosure separately and optionally provides an articulable multi-arm plant support that utilizes a support hub that can be adjusted along a vertical pole.

The present disclosure separately and optionally provides an articulable multi-arm plant support that allows a plurality of articulable multi-arm plant supports to be utilized together, at adjustable, spaced apart locations, along a vertical pole.

The present disclosure separately and optionally provides an articulable multi-arm plant support that support arms that can be manipulated between a collapsed position (i.e., for storage) and an expanded position (i.e., for plant support).

The present disclosure separately and optionally provides an articulable multi-arm plant support that can be easily utilized by a user.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures.

While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
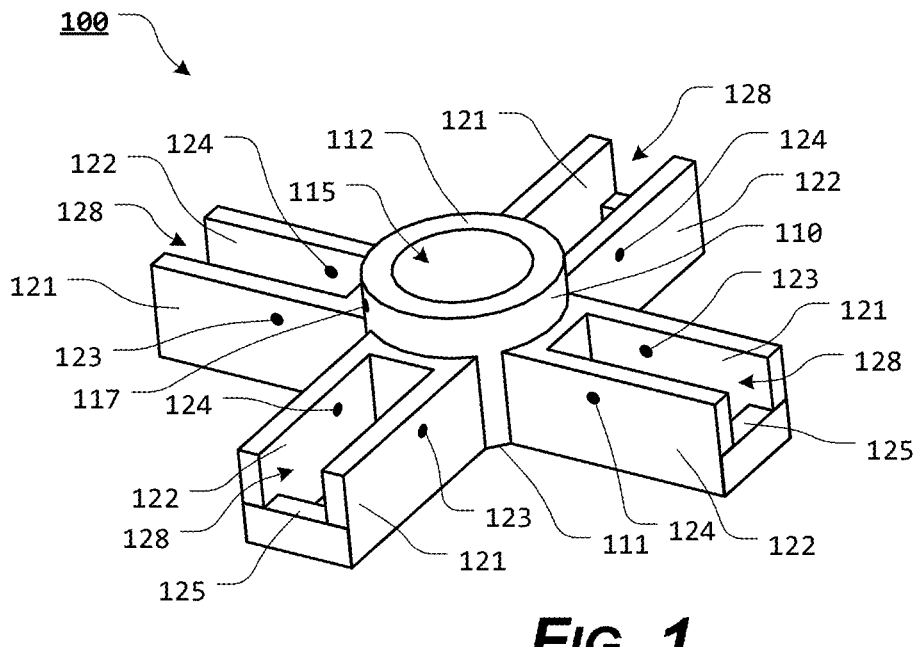
FIG. 1 illustrates an upper perspective view of certain exemplary components of an exemplary embodiment of an articulable multi-arm plant support hub, according to the present disclosure.
Figure 2:
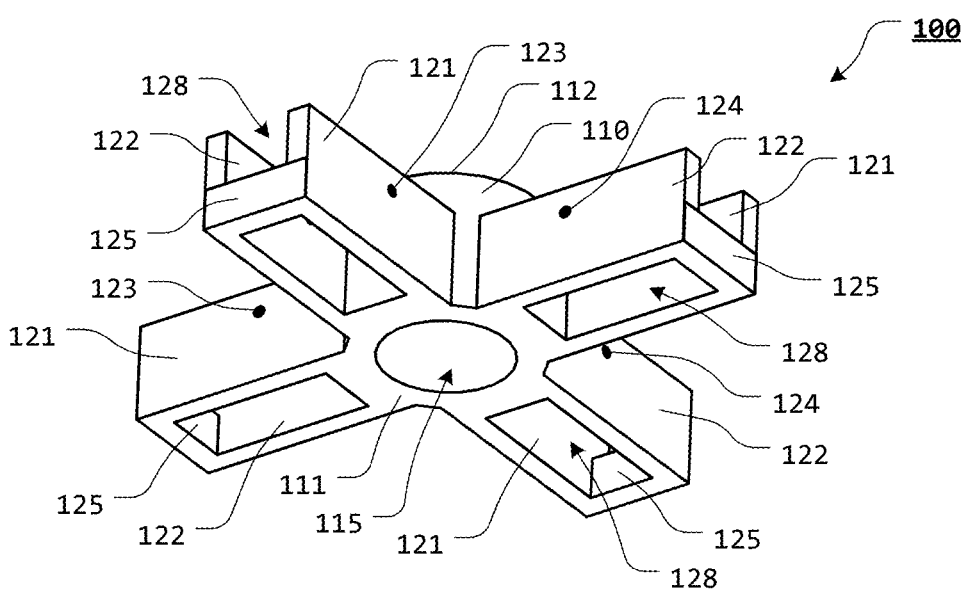
FIG. 2 illustrates a lower perspective view of certain exemplary components of an exemplary embodiment of an articulable multi-arm plant support hub, according to the present disclosure.
Figure 3:
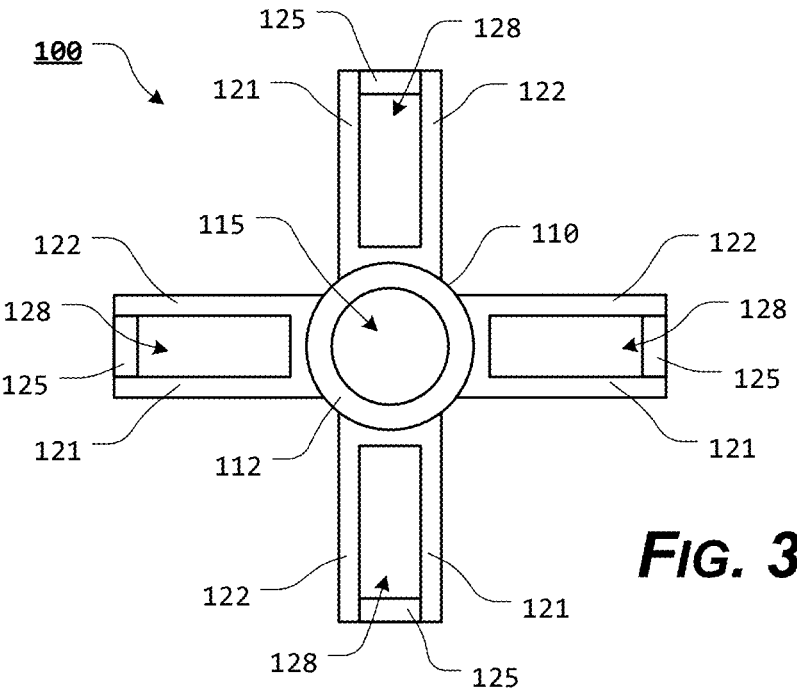
FIG. 3 illustrates a top view of certain exemplary components of an exemplary embodiment of an articulable multi-arm plant support hub, according to the present disclosure.
Figure 4:
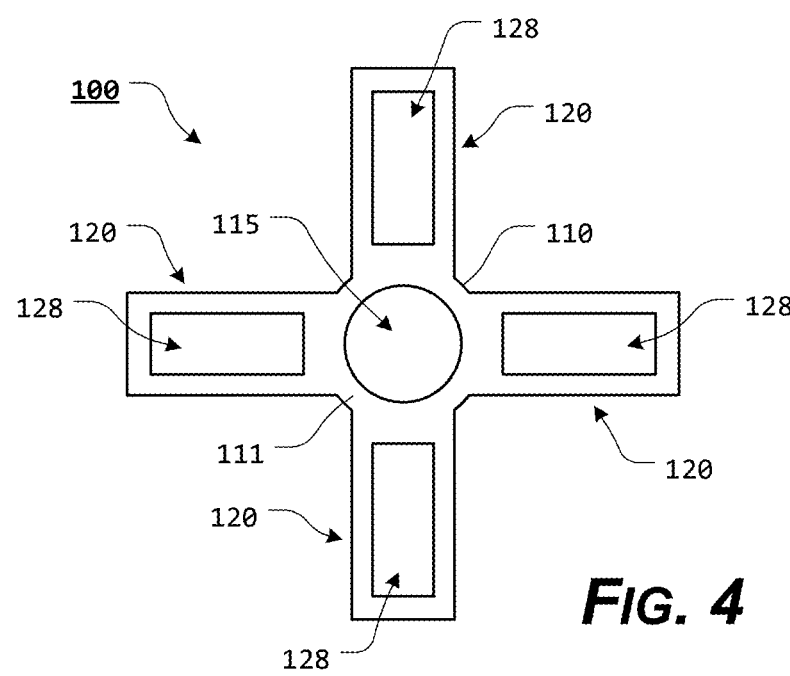
FIG. 4 illustrates a bottom view of certain exemplary components of an exemplary embodiment of an articulable multi-arm plant support hub, according to the present disclosure.
Figure 5:
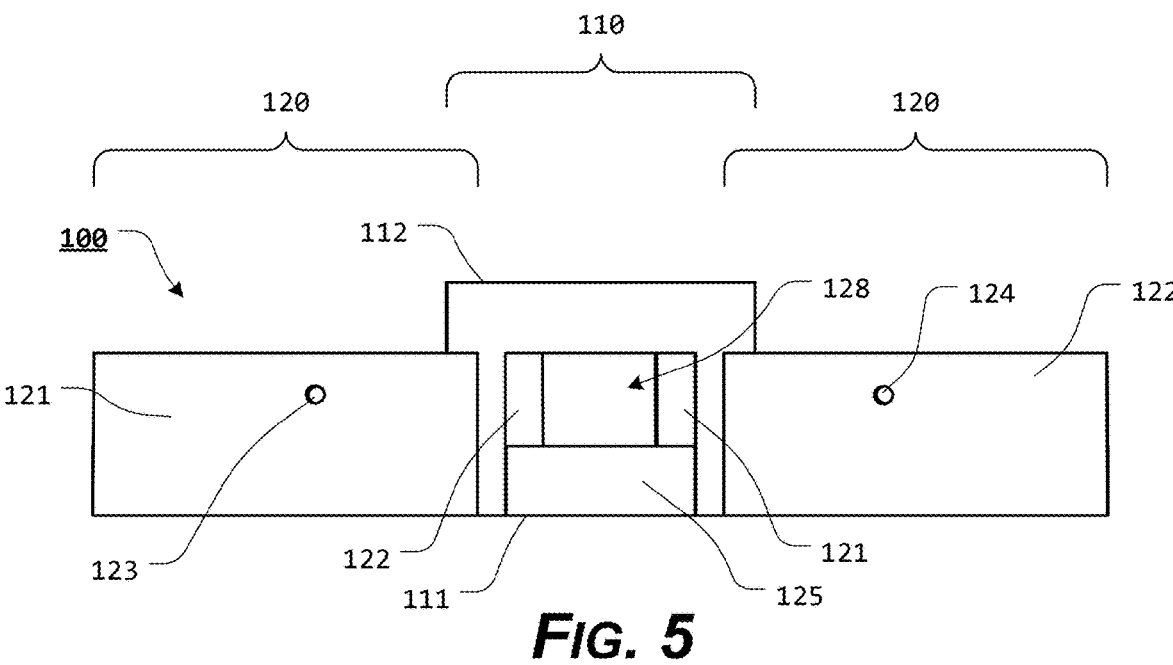
FIG. 5 illustrates a right side view of certain exemplary components of an exemplary embodiment of an articulable multi-arm plant support hub, according to the present disclosure.
Figure 6:
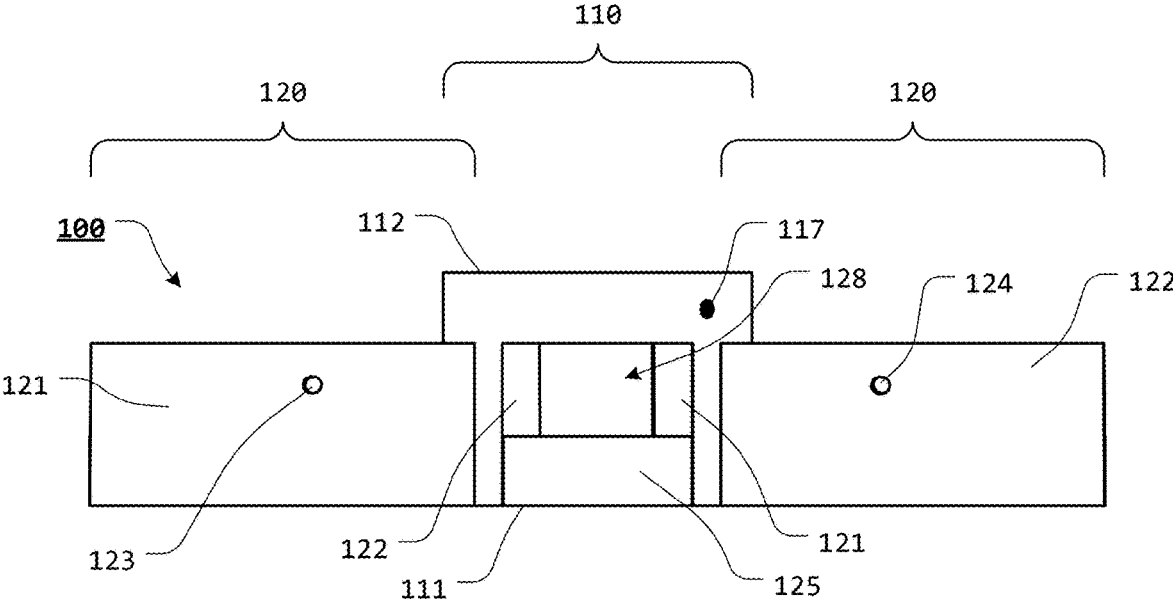
FIG. 6 illustrates a left side view of certain exemplary components of an exemplary embodiment of an articulable multi-arm plant support hub, according to the present disclosure.
Figure 7:
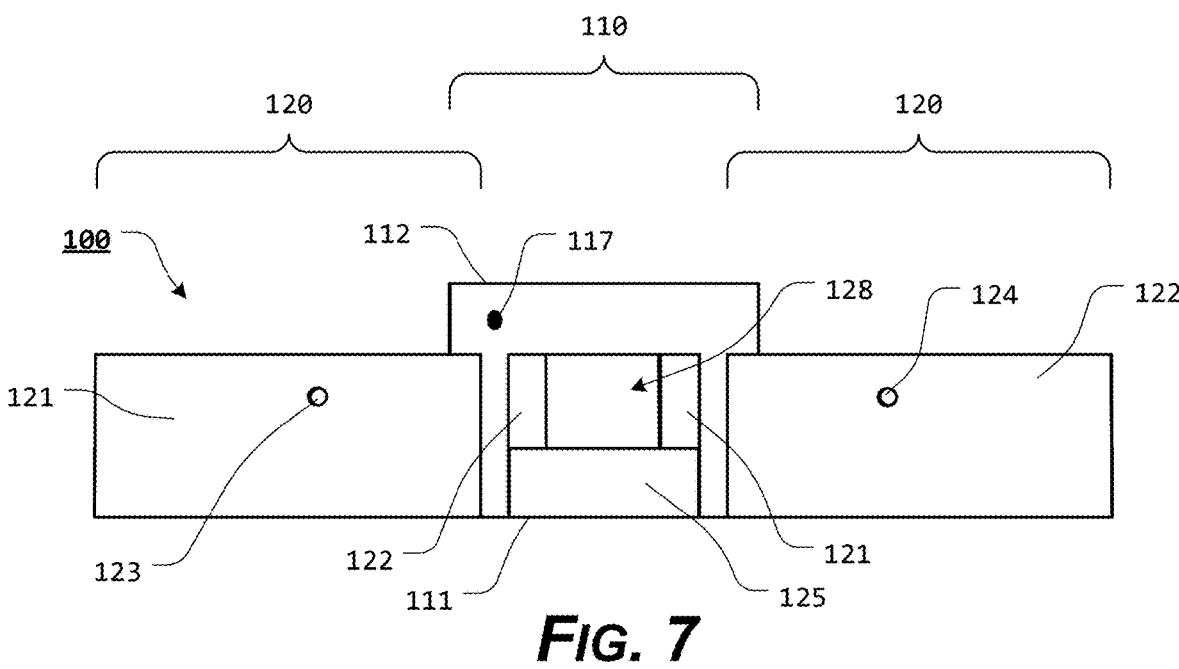
FIG. 7 illustrates a front view of certain exemplary components of an exemplary embodiment of an articulable multi-arm plant support hub, according to the present disclosure.
Figure 8:
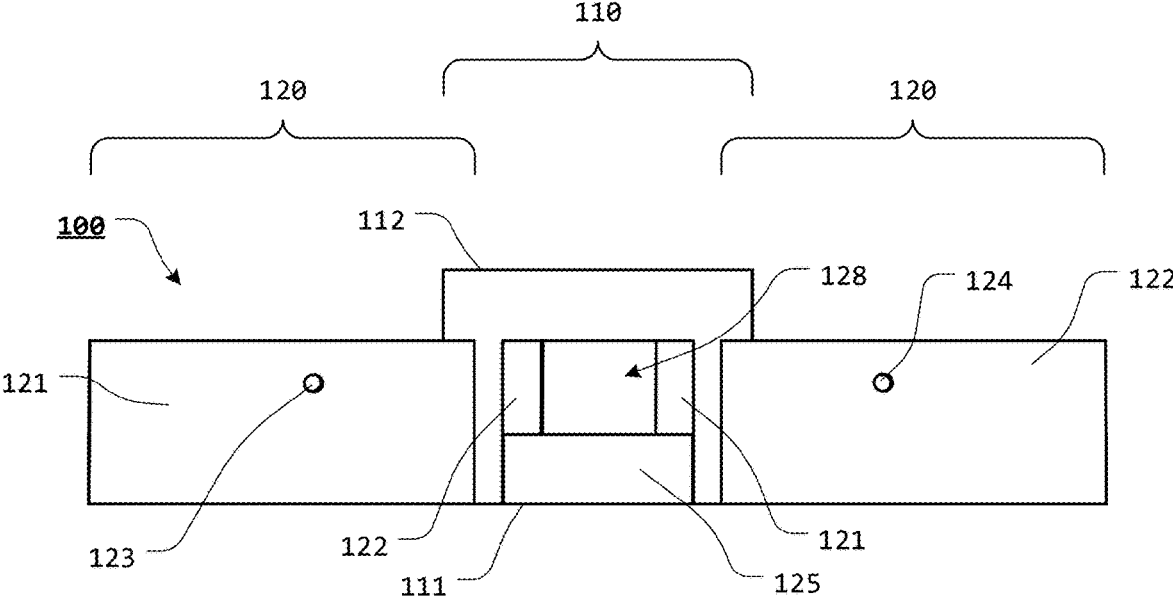
FIG. 8 illustrates a rear view of certain exemplary components of an exemplary embodiment of an articulable multi-arm plant support hub, according to the present disclosure.
Figure 9:
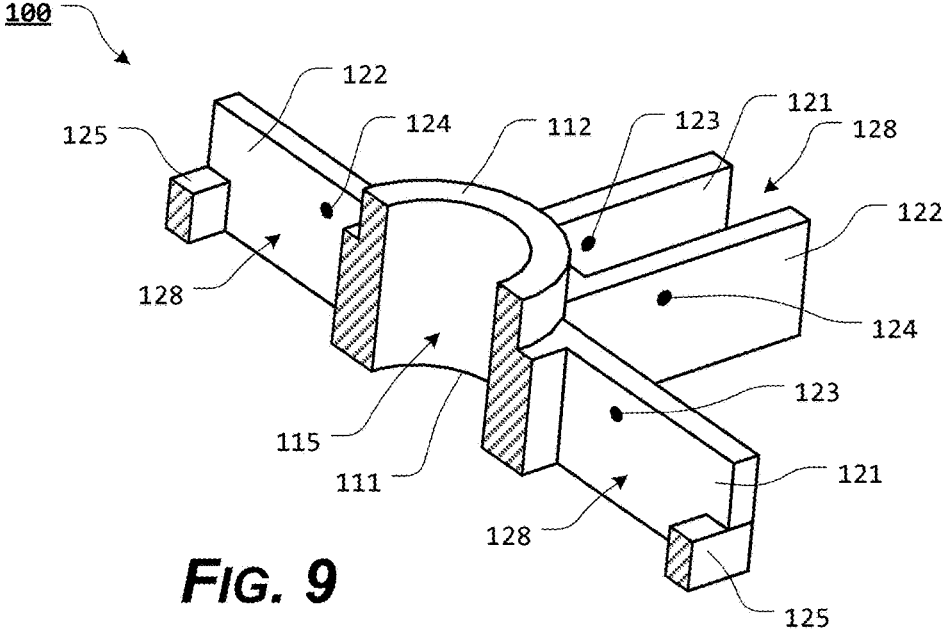
FIG. 9 illustrates an upper perspective cross-sectional view of certain exemplary components of an exemplary embodiment of an articulable multi-arm plant support hub, according to the present disclosure.
Figure 10:
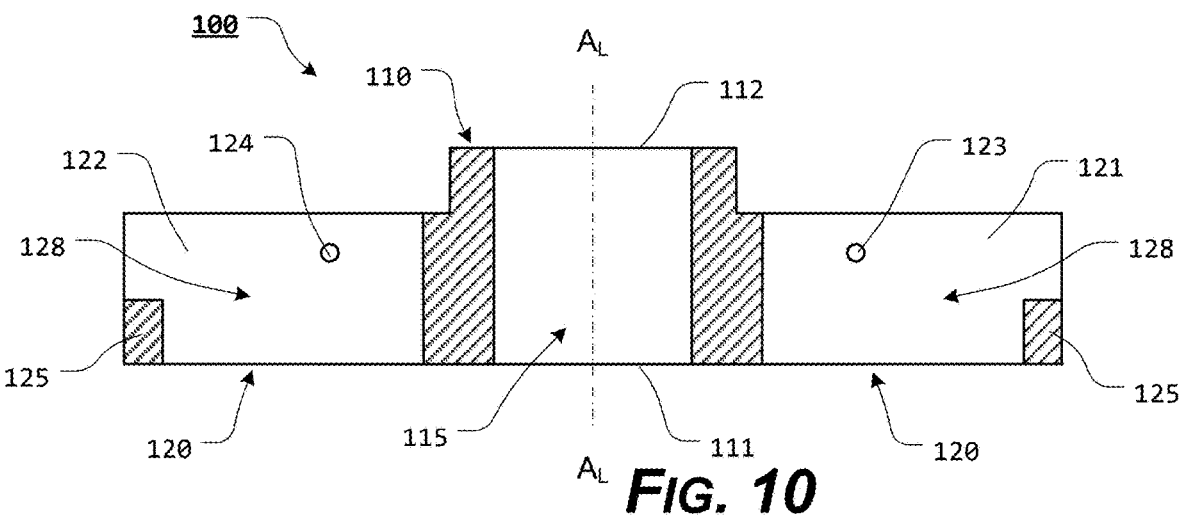
FIG. 10 illustrates a side cross-sectional view of certain exemplary components of an exemplary embodiment of an articulable multi-arm plant support hub, according to the present disclosure.

For simplicity and clarification, the design factors and operating principles of the articulable multi-arm plant support according to the present disclosure are explained with reference to various exemplary embodiments of an articulable multi-arm plant support according to the present disclosure. The basic explanation of the design factors and operating principles of the articulable multi-arm plant support is applicable for the understanding, design, and operation of the articulable multi-arm plant support of the present disclosure. It should be appreciated that the articulable multi-arm plant support can be adapted to many applications where a plant support can be used.

As used herein, the word "may" is meant to convey a permissive sense (i.e., meaning "having the potential to"), rather than a mandatory sense (i.e., meaning "must"). Unless stated otherwise, terms such as "first" and "second", "right" and "left", "top" and "bottom", "upper" and "lower", and "horizontal" and "vertical" are used to arbitrarily distinguish between the exemplary embodiments and/or elements such terms describe. Thus, these terms are not necessarily intended to indicate temporal or other prioritization of such exemplary embodiments and/or elements.

As used herein, and unless the context dictates otherwise, the term "coupled" is intended to include both direct coupling (in which two elements that are coupled to each other contact each other) and indirect coupling (in which at least one additional element is located between the two elements). The term coupled, as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that, for simplicity and clarification, certain embodiments of the present disclosure may be described using terms such as "front", "back", "rear", "right", "left", "upper", "lower", "outer", and/or "inner". However, it should be understood that these terms are merely used to aid in understanding the present disclosure are not to be construed as limiting the systems, methods, devices, and/or apparatuses of the present disclosure. Additionally, it should be appreciated that, unless otherwise stated, the design factors and operating principles of the presently disclosed articulable multi-arm plant support may optionally be used in a "mirror image" assembly, wherein elements shown and/or described as being included in or on a drive end portion may optionally be included in or on a non-drive end portion. Alternatively, certain of the elements that are shown and/or described as being included in or on a back portion may optionally be included in or on a front portion, or vice versa.

It should also be appreciated that the terms "articulable multi-arm plant support", "plant support", "plant support structure", "hub", and "arm" are used for basic explanation and understanding of the operation of the systems, methods, and apparatuses of the present disclosure. Therefore, the terms "articulable multi-arm plant support", "plant support", "plant support structure", "hub", and "arm" are not to be construed as limiting the systems, methods, and apparatuses of the present disclosure.

Furthermore, it should be appreciated that, for simplicity and clarification, the embodiments of the present disclosure will be shown and/or described with reference to a certain number of hub arms (and associated support arms) extending from a hub core. However, it should be appreciated that the inclusion and/or specific placement of any number of hub arms (and associated support arms) is not essential to the articulable multi-arm plant support of the present disclosure.

For example, the number of hub arms (and associated support arms) per hub core or support pole depends on the type of plant being supported. For example, a tomato may need four hub arms (and associated support arms), while a pepper may only need one hub arms (and associated support arms). The idea is that customers could buy additional hub arms (and associated support arms) for any support pole to satisfy the needs of the plants they are growing. One customer's tomato may only need three hub arms (and associated support arms), while another customer's tomato may need four hub arms (and associated support arms). Additional hub arms (and associated support arms) may be added, even after a customer buys the initial plant support system. Part of the design of this plant support structure is to create flexibility and allow for modifications after the support pole is in the field and the plant is growing.

Turning now to the appended drawing figures, FIGS. 1-16 illustrate certain elements and/or aspects of an exemplary embodiment of an articulable multi-arm plant support assembly 105 having an articulable multi-arm plant support hub 100, according to the present disclosure. As illustrated, the articulable multi-arm plant support assembly 105 comprises at least some of a support hub 100 and one or more support arms 130.

In certain exemplary embodiments, as illustrated most clearly in FIGS. 1-10, the support hub 100 includes at least some of a hub core 110 and hub arms 120.

In various exemplary, nonlimiting embodiments, the hub core 110 is a substantially cylindrically shaped element, formed of one or more walls or wall portions, which extends from a hub core bottom wall 111 to a hub core top wall 112. An open hub core aperture 115 extends through the hub core 110, parallel to the longitudinal axis $A_L$, of the hub core 110, from the hub core bottom wall 111 to the hub core top wall 112.

In various exemplary embodiments, the hub core aperture 115 is formed so as to allow at least a portion of a support pole 190 to be repeatably, slidably received through the hub core aperture 115. In this manner, the support hub 100 may be slidably positioned around a support pole 190 at a desired position and repositioned, as needed, as the plant grows. A set screw aperture 117 may optionally be formed through a portion of the hub core 110, extending perpendicular to the longitudinal axis $A_L$, of the hub core 110, and extending from an outer surface of the hub core 110 into the hub core aperture 115. In this manner, interaction between the set screw aperture 103 and a set screw 170 may optionally allow at least a portion of the set screw 170 to be threadably inserted into or retracted from the hub core aperture 115. Thus, when the support hub 100 is in a desired position relative to the support pole 190, the set screw 170 may be threadably inserted through the set screw aperture 117 to frictionally engage at least a portion of the support pole 190 and aid in maintaining the support hub 100 in the desired position relative to the support pole 190.

The hub core 110 includes one or more hub arms 120 extending radially (substantially perpendicular to the longitudinal axis $A_L$, of the hub core 110) from the hub core 110. As illustrated, the hub core 110 includes four hub arms 120 extending radially (substantially perpendicular to the longitudinal axis $A_L$, of the hub core 110) from the hub core 110. It should be appreciated that the number of hub arms 120 is a design choice and the present disclosure is not limited to a particular number of hub arms 120. Thus, it should be understood that the present disclosure is not limited to a configuration having four hub arms 120, as illustrated. Thus, one or more hub arms 120 may extend from the hub core 110.

Each hub arm 120 extends from a hub arm proximal end, which extends from the hub core 110, to a hub arm distal end.

Each hub arm 120 comprises at least some of a pair of opposed side walls comprising a first hub arm sidewall 121 and a second hub arm sidewall 122. Typically, at least interior surfaces of the first hub arm sidewall 121 and the second hub arm sidewall 122 are substantially parallel to one another.

A hub arm recess 128 is defined between at least portions of the interior surfaces of the first hub arm sidewall 121 and the second hub arm sidewall 122. In certain exemplary embodiments, the hub arm recess 128 extends through a hub arm top wall, through the hub arm 120, and through a hub arm bottom wall. Alternatively, the hub arm recess 128 may extend through a hub arm top wall, toward, but not completely through the hub arm bottom wall.

Each hub arm 120 further comprises a hub arm support wall 125, which extends between at least a portion of the first hub arm sidewall 121 and the second hub arm sidewall 122, proximate the hub arm distal end of the hub arm 120. In various exemplary embodiments, the hub arm support wall 125 extends from the hub arm bottom wall, toward the hub arm top wall, but not too or through the hub arm top wall.

In certain exemplary embodiments, one or more of the first hub arm sidewall 121, the second hub arm sidewall 122, and/or the hub arm support wall 125 are individual wall elements attached or coupled to the hub core 110. Alternatively, the first hub arm sidewall 121, the second hub arm sidewall 122, and/or the hub arm support wall 125 may be formed from any number or combination of walls, including, for example, a single, continuous wall. Thus, it should be appreciated that the first hub arm sidewall 121, the second hub arm sidewall 122, and/or the hub arm support wall 125 may be formed of a single, continuous wall portion, two or more coupled or joined wall portions, or multiple coupled or joined wall portions.

In certain exemplary embodiments, the first hub arm sidewall 121 and the second hub arm sidewall 122 are sufficient to define the hub arm recess 128 for receiving a portion of a support arm 130. Alternatively, portions of the first hub arm sidewall 121, the second hub arm sidewall 122, and the hub arm support wall 125 define the hub arm recess 128 for receiving a portion of a support arm 130.

It should be noted that at least the interior side walls of the first hub arm sidewall 121, the second hub arm sidewall 122, and the hub arm support wall 125 may be substantially planar. Alternatively, at least the interior side walls of the first hub arm sidewall 121, the second hub arm sidewall 122, and the hub arm support wall 125 may be contoured or shaped to better accommodate a specific type or portion of a support arm 130 to be pivotably retained within the hub arm recess 128.

At least one first hub arm aperture 123 is formed through the first hub arm sidewall 121. Similarly, at least one second hub arm aperture 124 is formed through the second hub arm sidewall 122. The at least one first hub arm aperture 123 and the at least one second hub arm aperture 124 are formed such that a borehole axis of each of the first hub arm aperture 123 and the second hub arm aperture 124 are parallel to one another. In this manner, a pivot pin 150 may be slidably or threadably positioned through the aligned first hub arm aperture 123 and second hub arm aperture 124.

Once appropriately positioned through the aligned first hub arm aperture 123 and second hub arm aperture 124, the pivot pin 150 may be maintained in a desired position relative to the aligned first hub arm aperture 123 and second hub arm aperture 124 via frictional engagement between an interior surface of one or more of the first hub arm aperture 123 and the second hub arm aperture 124. Alternatively, the pivot pin 150 may be maintained in a desired position relative to the aligned first hub arm aperture 123 and second hub arm aperture 124 via an adhesive, interaction between external threads of the pivot pin 150 and internal threads of the first hub arm aperture 123 and the second hub arm aperture 124, or other means.

In various exemplary embodiments, the hub support 100 is substantially rigid and is formed of a polymeric material such as a polymeric composite. Alternate materials of construction may include one or more of the following: steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset sheet materials, or the like, and/or various combinations of the foregoing.

Thus, it should be understood that the material or materials used to form the hub support 100 and/or various components of the hub support 100 is a design choice based on the desired appearance and functionality of the hub support 100.

In certain exemplary embodiments, the portions or elements of the hub support 100 may be formed as a single, continuous, integral unit. Thus, it should be appreciated that certain elements of the hub support 100 may be formed as a monolithic, one-piece, or integral unit.

In certain exemplary embodiments, the hub support 100 may comprise two or more discrete, independent elements, such as, for example, the hub core 110 and the hub arms 120, attached or coupled together. Thus, adjacent portions of the hub support 100 may be attached or coupled together by one or more attachment elements comprising, for example, a chemical adhesive. Alternatively, the attachment elements may optionally comprise adhesive bonding, heat, ultrasonic, or other types of welding, screws, rivets, pins, mating hook and loop portions, snap or releasable fasteners, other fasteners, or other known or later developed means or methods for permanently or releasably attaching or coupling portions of the hub support 100 to one another.

A support arm 130 is associated with each hub arm 120. Each support arm 130 extends from a support arm proximal end 131 to a support arm distal end 132. It should be appreciated that the overall length of each support arm 130 is a design choice based upon the desired functionality, plant compatibility, and/or extent or coverage of the articulable multi-arm plant support assembly 105. It should also be appreciated that support arms 130 of varying lengths can be utilized as part of a single articulable multi-arm plant support assembly 105 or two or more articulable multi-arm plant support assemblies 105 may be utilized on a single support pole 190, providing articulable multi-arm plant support assemblies 105 of varying support arm 130 coverage spaced apart along a single support poles 190.

It should also be appreciated that, for simplicity and clarification, the various exemplary, nonlimiting embodiments of the articulable multi-arm plant support assembly 105 are illustrated and/or described with reference to the support arm 130 having a substantially circular, cross-sectional profile, when viewed from the support arm proximal end 131 or the support arm distal end 132.

The cross-sectional profile of each support arm 130 is a design choice based upon the desired functionality, plant compatibility, and/or extent or coverage of the articulable multi-arm plant support assembly 105. In various exemplary embodiments, the cross-sectional profile of each support arm 130 is substantially circular, resulting in a substantially cylindrical support arm 130. However, the generally circular cross-sectional profile of the support arm 130 is intended to be illustrative, not limiting the profile or geometry of the support arm 130 to any particular shape. It should be understood that the overall profile and/or geometry of the support arm 130 may comprise any overall profile or geometry, including, for example, a generally square, rectangle, triangular, pentangular, circular, oval, elliptical, elliptical torus, star, or other shape.

Additionally, the size and/or material of construction of the support arm 130 may vary.

Therefore, it should be understood that the length, shape, profile, geometry texture, and/or features of the support arm 130 is a design choice based, at least in part, on the desired appearance, strength, and/or functionality of the support arm 130.

At least one support arm aperture 135 is formed through a portion of the support arm 130 proximate the support arm proximal end 131. The at least one support arm aperture 135 is formed so as to allow at least a portion of the pivot pin 150 to be urged therethrough and provides a pivot aperture about which the support arm 130 is able to pivot.

An arm projection 140 extends from an area proximate the support arm distal end 132 of each support arm 130. In various exemplary embodiments, the arm projection 140 comprises a screw or nail extending from a proximal portion of the support arm distal end 132 of each support arm 130. Alternatively, each arm projection 140 may be an integrally formed or attached protrusion from the support arm distal end 132 of each arm projection 140. In still other exemplary, nonlimiting embodiments, each arm projection 140 may be defined by a notched or groove formed proximate the support arm distal end 132.

In various exemplary embodiments, certain of the arm projections 140 may optionally extend at an acute or obtuse angle relative to a longitudinal axis $A_L$, of the respective support arm 130. Alternatively, certain of the arm projections 140 may optionally extend at a right angle relative to a longitudinal axis $A_L$, of the respective support arm 130.

The arm projections 140 provide a stop proximate the support arm distal end 132 of each support arm 130, so that, for example, plant branches can be positioned and maintained along the support arms 130, without falling off of the support arm distal end 132 of the support arm 130. The arm projections 140 also, and separately, provide a projection or recess that allows, for example, a string or cord 160, webbing, or other items to be attached to the arm projections 140.

Figures 11, 12:
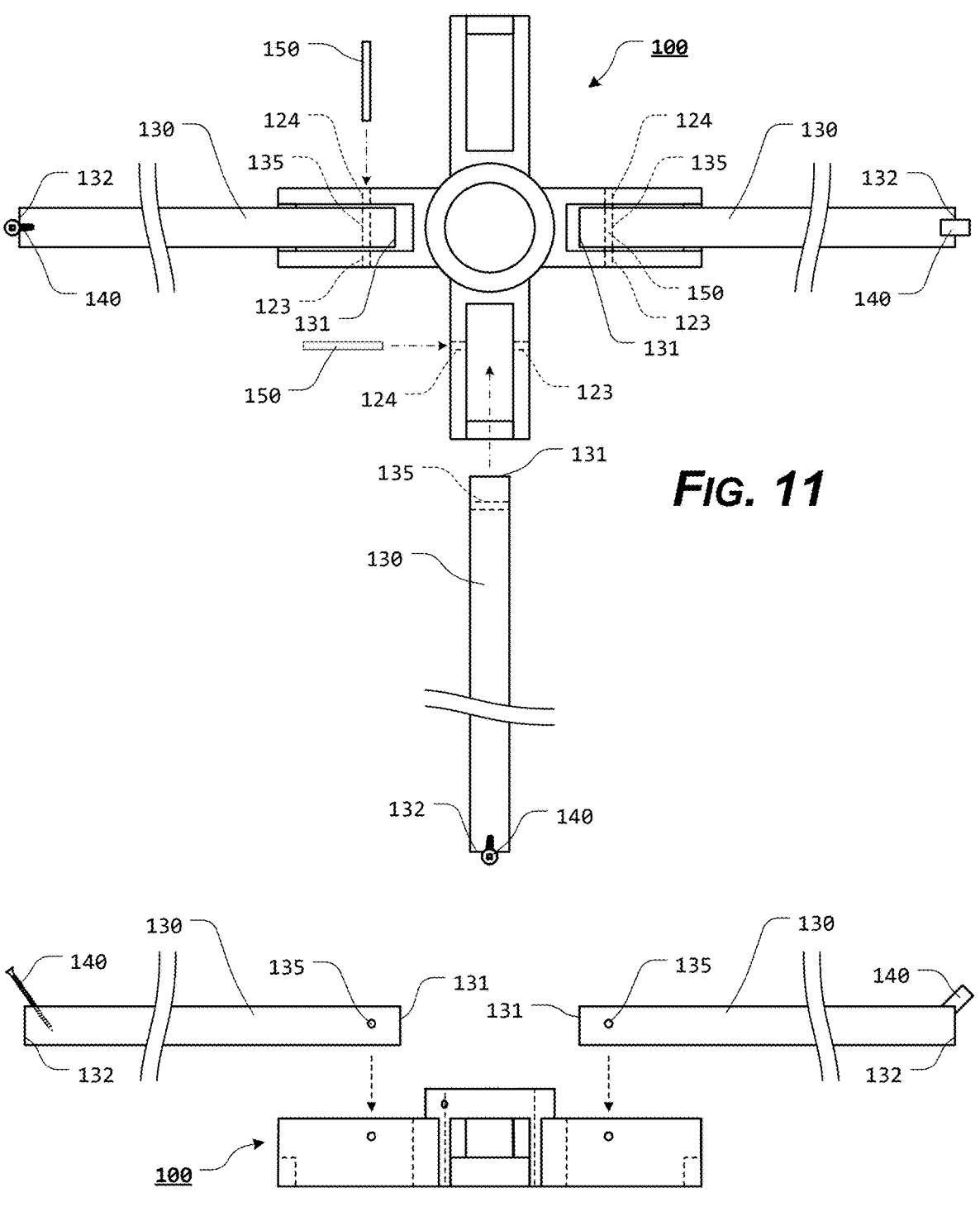
FIG. 11 illustrates an exploded, partially assembled, top view of certain exemplary components of an exemplary embodiment of an articulable multi-arm plant support assembly, according to an exemplary embodiment of the present disclosure.
FIG. 12 illustrates an exploded, partially assembled, side view of certain exemplary components of an exemplary embodiment of an articulable multi-arm plant support assembly, according to an exemplary embodiment of the present disclosure.
Figure 13:
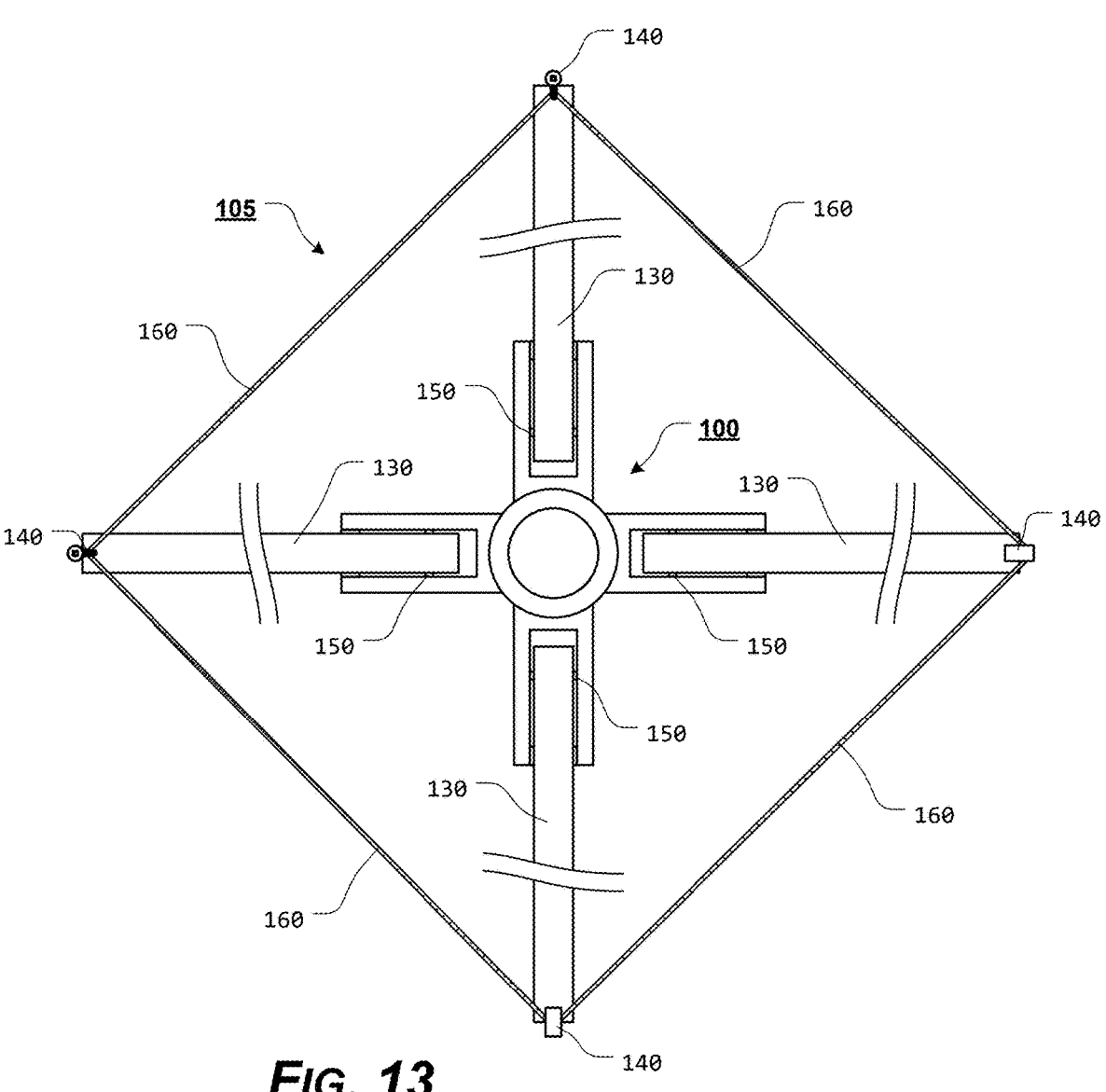
FIG. 13 illustrates an assembled, top view of certain exemplary components of an exemplary embodiment of an articulable multi-arm plant support assembly, according to an exemplary embodiment of the present disclosure.

As illustrated most clearly in FIGS. 11-12, during assembly of the articulated multi-arm plant support assembly 105, a portion of a support arm 130 is positioned within a corresponding hub arm recess 128, such that the support arm aperture 135 of the support arm 130 is aligned with the first hub arm aperture 123 and the second hub arm aperture 124 of the corresponding support arm 130. Once appropriately aligned, a pivot pin 150 is urged through the aligned first hub arm aperture 123, support arm aperture 135, and second hub arm aperture 124. Thus, the pivotably attached support arm 130 is able to be repeatably rotated or articulated, via the pivot pin 150, between a collapsed position (i.e., for storage or to adjust vines) and an expanded position (i.e., for plant support), as illustrated in FIG. 14.

Figure 14:
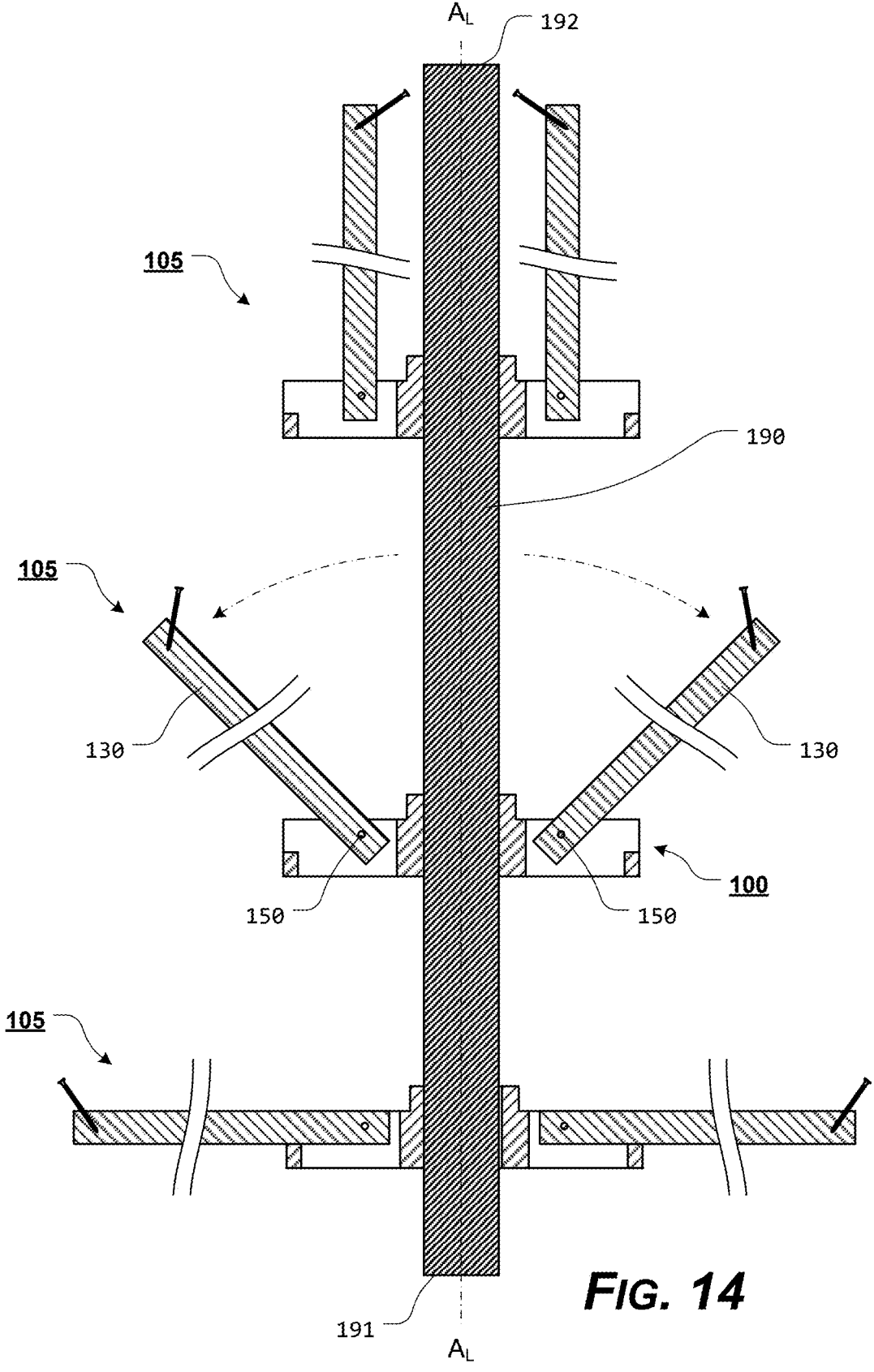
FIG. 14 illustrates a side cross-sectional view of certain exemplary components of an exemplary embodiment of an articulable multi-arm plant support assembly, according to an exemplary embodiment of the present disclosure.
Figure 15:
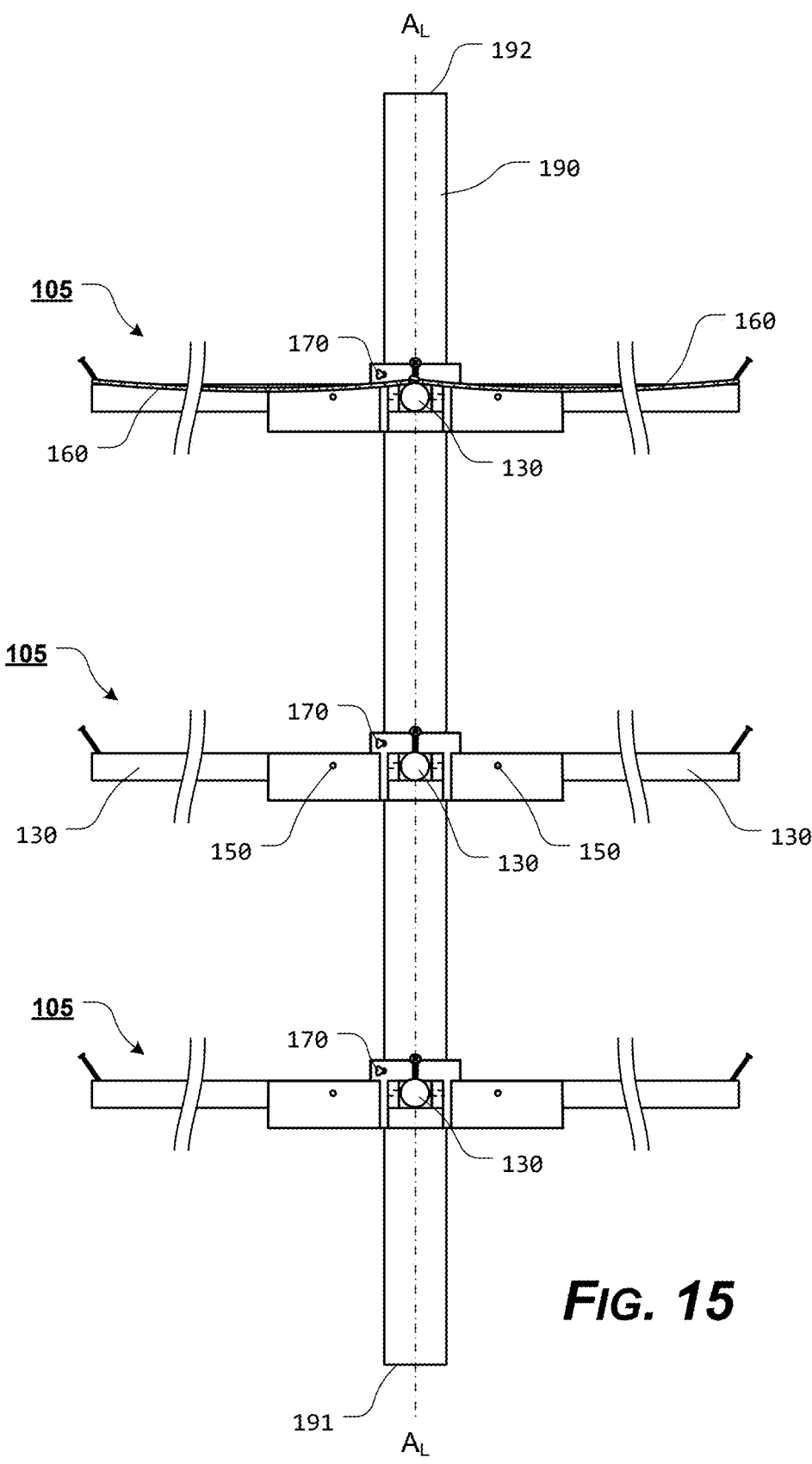
FIG. 15 illustrates a side view of certain exemplary components of an exemplary embodiment of an articulable multi-arm plant support assembly, according to an exemplary embodiment of the present disclosure.

As illustrated in FIG. 14, the attached support arms 130 of the uppermost articulated multi-arm plant support assembly 105 are rotated or articulated to the collapsed position. The central articulated multi-arm plant support assembly 105 illustrates the support arms 130 being rotated or articulated toward the extended position, as illustrated by the semicircular arrows. Finally, the bottommost central articulated multi-arm plant support assembly 105 illustrates the support arms 130 rotated or articulated into the extended position.

In various exemplary embodiments, when in the extended position, a portion of each support arm 130 contacts a portion of the hub arm support wall 125 in order to keep the support arm 130 from further rotation. It should be appreciated that the angle of the support arms 130 relative to the support hub 100, when in the extended position, can be dictated based on the relative height or position of the hub arm support walls 125.

Notwithstanding any of the foregoing, it should also be understood that the overall size and shape of the articulable multi-arm plant support assembly 105 and the various portions thereof is a design choice based upon the desired functionality and/or appearance of the articulable multi-arm plant support assembly 105.

During use, one or more articulable multi-arm plant support assemblies 105 are utilized in conjunction with a single support pole 190. The vertical support pole 190 is the main support for each of the articulated multi-arm plant support assemblies 105. The support pole 190 generally extends from a support pole bottom end 191, along a longitudinal axis $A_L$, to a support pole top end 192. Generally, a portion of the support pole bottom end 191 is positioned in the ground or in some alternative support element or structure.

In various exemplary embodiments, the support pole 190 may optionally be made of a portion of bamboo or constructed of a synthetic material such as a polyvinyl chloride (PVC) pipe. The length of the support pole 190 can be changed depending on the type of plant that the support pole 190 will be used to support. For example, an indeterminate cherry tomato will need a longer support pole 190 than an indeterminate Roma tomato. Bamboo is more authentic and pleasing to most gardeners; however, it is difficult to work with and would be much more expensive than using a PVC support pole 190. A different support pole 190 diameter and/or material of construction can be used depending on whether the support structure is to be utilized in conjunction with a tomato or a pepper.

During use, as a plant grows, the plant must be trained to grow up the vertical support pole 190. This is accomplished by tying or otherwise attaching or coupling the plant to the support pole 190 as the plant grows.

The support arms 130 are used to keep the stems of the plant up and growing vertically. Also, to keep them from bushing straight out and breaking. The length of the support arms 130 depends on the plant type and how high up the support pole 190 the support arms 130 will be placed.

This point of the support arm 130 will be used to attach string or cord 160 between the support arms 130 to make a circular/square enclosure to support stems and vines growing randomly. The plant can be further "trained" to the support pole 190 by tying or attaching one or more portions of the plant to the string or cord 160 and/or the support arms 130.

Tying or attaching the string or cord 160 to the arm projection(s) 140 or "L" shaped portion(s) of the support arm 130 will allow the string or cord 160 to be adjustable depending on stem and vine growth. Also, being detachable on at least one end will allow greater flexibility when trying to train and support plants as they grow.

Figure 16:
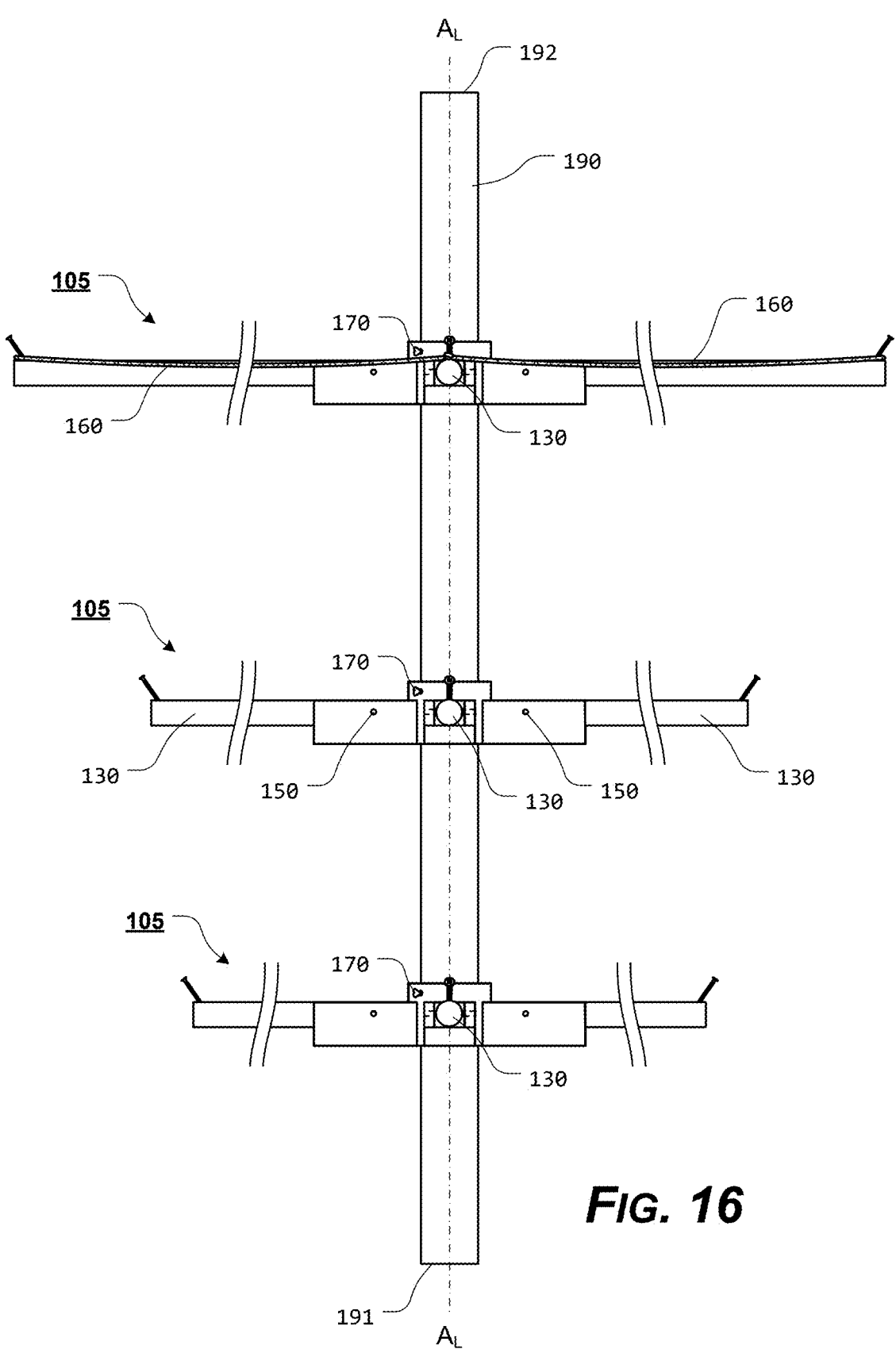
FIG. 16 illustrates a side view of certain exemplary components of an exemplary embodiment of an articulable multi-arm plant support assembly, according to an exemplary embodiment of the present disclosure.

In various exemplary embodiments, as illustrated, for example, in in FIG. 16, articulable multi-arm plant support assemblies 105 having support arms 130 of different lengths may be utilized in conjunction with a single support pole 190. For example, for use with tomatoes, a top support arm 130 may be two to three times the size of the support arms 130 below it. The extra length will lead the vines away from the support pole 190 so that they can grow back down to the ground, creating a "teepee" shape. This design may be especially useful for certain indeterminate tomatoes that can grow 8 to 10 feet.

A more detailed explanation of the instructions regarding how to utilize the articulable multi-arm plant support assembly 105 is not provided herein because it is believed that the level of description provided herein is sufficient to enable one of ordinary skill in the art to understand and practice the systems, methods, and apparatuses, as described.

While the present disclosure has been described in conjunction with the exemplary embodiments outlined above, the foregoing description of exemplary embodiments of the present disclosure, as set forth above, are intended to be illustrative, not limiting and the fundamental disclosed systems, methods, and/or apparatuses should not be considered to be necessarily so constrained. It is evident that the present disclosure is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. An articulable multi-arm plant support, comprising:
   a support hub having a hub core and one or more hub arms, wherein said hub core includes a hub core aperture extending through said hub core from a hub core bottom wall to a hub core top wall, substantially parallel to a longitudinal axis of said hub core, wherein each of said one or more hub arms extends radially from said hub core, wherein each of said hub arm extends from a hub arm proximal end to a hub arm distal end, wherein each hub arm includes a pair of opposed side walls comprising a first hub arm sidewall and a second hub arm sidewall, wherein a hub arm recess is defined between at least a portion of an interior surface of said first hub arm sidewall and at least a portion of an interior surface of said second hub arm sidewall, wherein each hub arm includes a hub arm support wall, which extends between at least a portion of said first hub arm sidewall and said second hub arm sidewall, proximate said hub arm distal end, wherein said hub arm recess extends through a portion of said hub arm top wall, through a portion of said hub arm, and through a portion of said hub arm bottom wall between a portion of said first hub arm sidewall, a portion of said second hub arm sidewall, and a portion of said hub arm support wall, and wherein at least one first hub arm aperture is formed through at least a portion of said first hub arm sidewall and wherein at least one second hub arm aperture is formed through at least a portion of said second hub arm sidewall; and
   one or more support arms, wherein each of said support arms extends from a support arm proximal end to a support arm distal end, wherein at least one support arm is associated with each hub arm, wherein at least one arm projection extends from an area proximate said support arm distal end of each support arm, wherein at least one support arm aperture is formed through a portion of each of said support arms proximate said support arm proximal end, and wherein a portion of at least one of said support arms is positioned within a corresponding one of said hub arm recesses, such that said support arm aperture of said one of said support arms is aligned with said first hub arm aperture and said second hub arm aperture of said corresponding one of said support arms and at least a portion of a pivot pin is urged through at least a portion of said first hub arm aperture, through said support arm aperture, and through at least a portion of said second hub arm aperture, such that said one of said support arms is pivotably attached or coupled to one of said hub arms and is pivotable such that said support arm distal end is pivoted away from said longitudinal axis of said hub core to an expanded position relative to said support hub such that in said expanded position said support arms extend radially from said hub core, and wherein in said expanded position a portion of said one of said support arms contacts an upper portion of said hub arm support wall to limit rotation or articulation of said one of said support arms past said expanded position.

2. The articulable multi-arm plant support of claim 1, wherein said hub core is substantially cylindrically shaped.

3. The articulable multi-arm plant support of claim 1, wherein each of said one or more hub arms extends substantially perpendicular to said longitudinal axis of said hub core.

4. The articulable multi-arm plant support of claim 1, wherein said hub arm proximal end of each of said one or more hub arms extends from said hub core.

5. The articulable multi-arm plant support of claim 1, wherein at least a portion of said interior surface of said first hub arm sidewall is substantially parallel to at least a portion of said interior surface of said second hub arm sidewall.

6. The articulable multi-arm plant support of claim 1, wherein a borehole axis of said first hub arm aperture is substantially parallel to a borehole axis of said second hub arm aperture.

7. The articulable multi-arm plant support of claim 1, wherein said hub support is formed as a monolithic, one-piece, or integral unit.

8. The articulable multi-arm plant support of claim 1, wherein said support arms comprise support arms of varying lengths.

9. The articulable multi-arm plant support of claim 1, wherein at least one set screw aperture is formed through a portion of said hub core such that interaction between said set screw aperture and a set screw allow at least a portion of said set screw to frictionally engage at least a portion of a support pole and aid in maintaining said support hub in said desired position relative to said support pole.

10. The articulable multi-arm plant support of claim 1, wherein each support arm has a substantially circular, cross-sectional profile, when viewed from said support arm proximal end or said support arm distal end.

11. The articulable multi-arm plant support of claim 1, wherein at least a portion of a support pole is repeatably, slidably receivable through said hub core aperture.

12. The articulable multi-arm plant support of claim 1, wherein a plurality of said support hubs are slidably positioned along a portion of a support pole.

13. The articulable multi-arm plant support of claim 1, wherein each arm projection is attached or coupled to said support arm distal end of a respective one of said arm projections.

14. The articulable multi-arm plant support of claim 1, wherein each arm projection is an integrally formed protrusion of said support arm distal end of a respective one of said arm projections.

15. The articulable multi-arm plant support of claim 1, wherein each arm projection is defined by a notch or groove formed proximate said support arm distal end of a respective one of said arm projections.

16. The articulable multi-arm plant support of claim 1, wherein a portion of a string or cord is attached or coupled between at least two of said arm projections.

17. The articulable multi-arm plant support of claim 1, wherein one of said support arms is pivotably attached or coupled to each of said hub arms such that each of said support arms is repeatably rotatable or articulable between a collapsed position and an expanded position.

18. The articulable multi-arm plant support of claim 1, wherein said hub arm support wall is formed proximate said hub core bottom wall, and wherein in an extended position, a portion of at least one of said support arms contacts a portion of said hub arm support wall in order to limit downward rotation or articulation of said support arm relative to said support hub.

19. An articulable multi-arm plant support, comprising:

a support hub having a hub core with a hub core aperture extending therethrough, substantially parallel to a longitudinal axis of said hub core, wherein one or more hub arms extend radially from said hub core, wherein each of said hub arm extends from a hub arm proximal end to a hub arm distal end, wherein each hub arm includes a first hub arm sidewall and a second hub arm sidewall, wherein each hub arm includes a hub arm support wall formed proximate said hub arm distal ends of said first hub arm sidewall and said second hub arm sidewall, wherein said hub arm recess extends through a portion of said hub arm top wall, through a portion of said hub arm, and through a portion of said hub arm bottom wall between a portion of said first hub arm sidewall, a portion of said second hub arm sidewall, and a portion of said hub arm support wall, and wherein at least one first hub arm aperture is formed through at least a portion of said first hub arm sidewall and wherein at least one second hub arm aperture is formed through at least a portion of said second hub arm sidewall; and one or more support arms, wherein each of said support arms extends from a support arm proximal end to a support arm distal end, wherein at least one support arm is associated with each hub arm, wherein at least one arm projection extends from an area proximate said support arm distal end of each support arm, wherein at least one support arm aperture is formed through a portion of each of said support arms proximate said support arm proximal end, and wherein a portion of at least one of said support arms is positioned such that said support arm aperture of said one of said support arms is aligned with said first hub arm aperture and said second hub arm aperture of said corresponding one of said support arms and at least a portion of a pivot pin is urged through at least a portion of said first hub arm aperture, through said support arm aperture, and through at least a portion of said second hub arm aperture, such that said one of said support arms is pivotably attached or coupled to one of said hub arms and is pivotable such that said support arm distal end is pivoted away from said longitudinal axis of said hub core to an expanded position relative to said support hub such that in said expanded position said support arms extend radially from said hub core, and wherein in said expanded position a portion of said one of said support arms contacts an upper portion of said hub arm support wall to limit rotation or articulation of said one of said support arms past said expanded position.

20. An articulable multi-arm plant support, comprising:

a support hub having a hub core with a hub core aperture extending therethrough, substantially parallel to a longitudinal axis of said hub core, wherein one or more hub arms extend radially from said hub core, wherein each of said hub arm extends from a hub arm proximal end to a hub arm distal end, wherein each hub arm includes a first hub arm sidewall and a second hub arm sidewall, wherein each hub arm includes a hub arm support wall formed proximate said hub arm distal ends of said first hub arm sidewall and said second hub arm sidewall, wherein said hub arm recess extends through a portion of said hub arm top wall, through a portion of said hub arm, and through a portion of said hub arm bottom wall between a portion of said first hub arm sidewall, a portion of said second hub arm sidewall, and a portion of said hub arm support wall, and wherein at least one first hub arm aperture is formed through at least a portion of said first hub arm sidewall and wherein at least one second hub arm aperture is formed through at least a portion of said second hub arm sidewall; and at least one support arm is associated with each hub arm, wherein at least one arm projection extends from an area proximate said support arm distal end of each support arm, wherein at least one support arm aperture is formed through a portion of each of said support arms proximate a support arm proximal end of each of said support arms, and wherein a portion of at least one of said support arms is positioned such that at least a portion of a pivot pin is positionable thorough at least a portion of said first hub arm aperture, through said support arm aperture, and through at least a portion of said second hub arm aperture such that said one of said support arms is pivotably attached or coupled to one of said hub arms and is pivotable such that said support arm distal end is pivoted away from said longitudinal axis of said hub core to an expanded position relative to said support hub such that in said expanded position said support arms extend radially from said hub core, and wherein in said expanded position a portion of said one of said support arms contacts an upper portion of said hub arm support wall to limit rotation or articulation of said one of said support arms past said expanded position.

\* \* \* \* \*